United States Patent
Brown

(10) Patent No.: US 8,961,354 B1
(45) Date of Patent: Feb. 24, 2015

(54) INFINITELY VARIABLE SPEED AMPLIFIER

(71) Applicant: William Robert Brown, Ann Arbor, MI (US)

(72) Inventor: William Robert Brown, Ann Arbor, MI (US)

(*) Notice: Subject to any disclaimer, the term of this patent is extended or adjusted under 35 U.S.C. 154(b) by 3 days.

(21) Appl. No.: 13/970,211

(22) Filed: Aug. 19, 2013

(51) Int. Cl.
  *F16H 48/06* (2006.01)
  *F16H 3/74* (2006.01)
  *F16H 48/05* (2012.01)

(52) U.S. Cl.
  CPC ............. *F16H 48/05* (2013.01); *Y10S 475/904* (2013.01)
  USPC ............................. 475/254; 475/220; 475/904

(58) Field of Classification Search
  USPC ........................................ 475/220, 254, 904
  See application file for complete search history.

(56) References Cited

U.S. PATENT DOCUMENTS

| | | | | | |
|---|---|---|---|---|---|
| 2,955,477 | A | * | 10/1960 | Ryan | 476/31 |
| 3,023,277 | A | * | 2/1962 | Mathews | 370/545 |
| 4,402,237 | A | * | 9/1983 | Tomlinson | 475/205 |
| 4,864,889 | A | * | 9/1989 | Sakakibara et al. | 475/211 |
| 5,055,094 | A | * | 10/1991 | Cataldo | 475/211 |
| 2011/0201470 | A1 | * | 8/2011 | Durnin | 475/149 |

* cited by examiner

*Primary Examiner* — Tisha Lewis

(57) ABSTRACT

An infinitely variable speed amplifier comprising a continuously variable unit ("variator"), two differential gear trains, and four shafts. Two of the shafts connect to opposite ends of the variator and to two connections of each differential gear train, respectively. The third connections of the first and second differential gear trains are connected to the input and output shafts respectively. Ratios and other parameters are chosen so that an acceptable range of transmission speeds can be achieved without the use of clutches while also minimizing the power crossing the variator. Furthermore, this invention includes a variant that is a compound infinitely variable speed amplifier that provides a wider performance range.

9 Claims, 4 Drawing Sheets

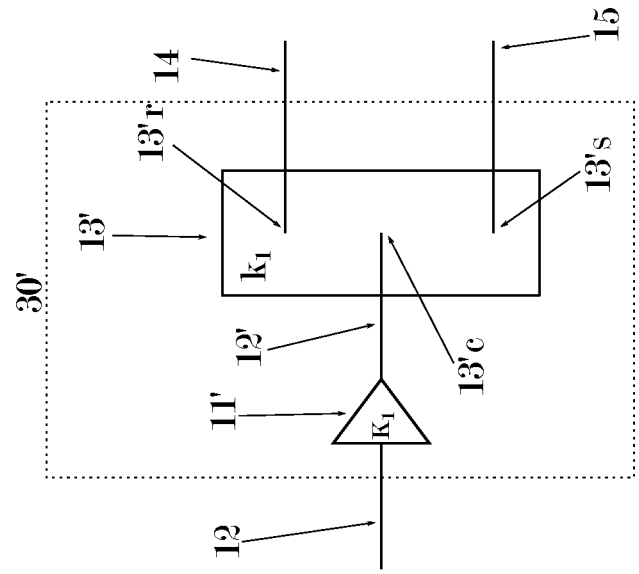
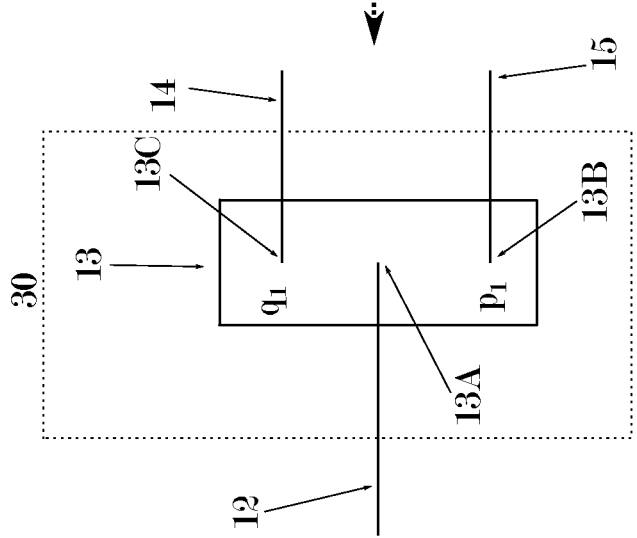
Fig. 2

INFINITELY VARIABLE SPEED AMPLIFIER

BACKGROUND OF THE INVENTION

Often an engine or motor will operate at speeds different from the required speed of a driven device. Thus, some form of transmission is used to bridge this speed difference (e.g., gears, pulleys etc). Furthermore, the desired speed of the driven device may change substantially while the desired operating speed range of the power supply is narrow (e.g., the internal combustion engine (ICE) in a car operates most efficiently between 1000-3000 rpm, while the driving speeds can vary between −30 mph and 100+ mph). To address such situations the transmission can be designed so that one of several gear ratios is selected at any particular time. In cars these are usually accomplished with manual transmissions (MT) or automatic transmissions (AT). Adding additional gears to a discrete transmission (MT or AT) allows the ICE to operate in a more efficient regime more often, but this is a case of diminishing returns (each additional gear adds less to the total efficiency) and makes the transmission more complicated and expensive.

However, it is still desirable to have the power supply operating at its most efficient operating point regardless of the speed of the driven device. A continuously variable transmission or variator can be used for this purpose. There are many ways to design a variator (e.g., two tapered rollers mounted on parallel rotating shafts pointing in opposite directions and coupled with a belt. Changing the position of the belt alters the speed ratio between the two shafts.) However, there are two shortcomings of variators which prevent them from being widely used in automotive applications; (a) mechanical variators transmit forces via friction and therefore the maximum torque that they can transmit is less than geared transmissions, and (b) variators are typically less efficient than a similarly scaled and well designed geared system.

It is known (U.S. Pat. No. 5,055,094, U.S. Pat. No. 2,955,477, U.S. Pat. No. 3,023,277, U.S. Pat. No. 4,402,237, U.S. Pat. No. 4,864,889, etc) that a variator can be coupled with one or more epicyclic gears to create an infinitely variable transmission (i.e., if the power supply is operating in a constant forward regime, the speed of the powered device can continuously change from forward through zero to reverse.) However, some power (and torque) must always cross the variator. US2011201470 discloses a device that includes a variator that controls the intermediate shafts. However, a need remains for transmissions with large speed ranges and high efficiency.

BRIEF DESCRIPTION OF DRAWINGS

FIG. 2 shows an example of how a generic differential gear train can be replaced with a kinematically equivalent differential epicyclic gear train with an additional mechanic gearing.

DETAILED DESCRIPTION OF INVENTION

Figure 1:
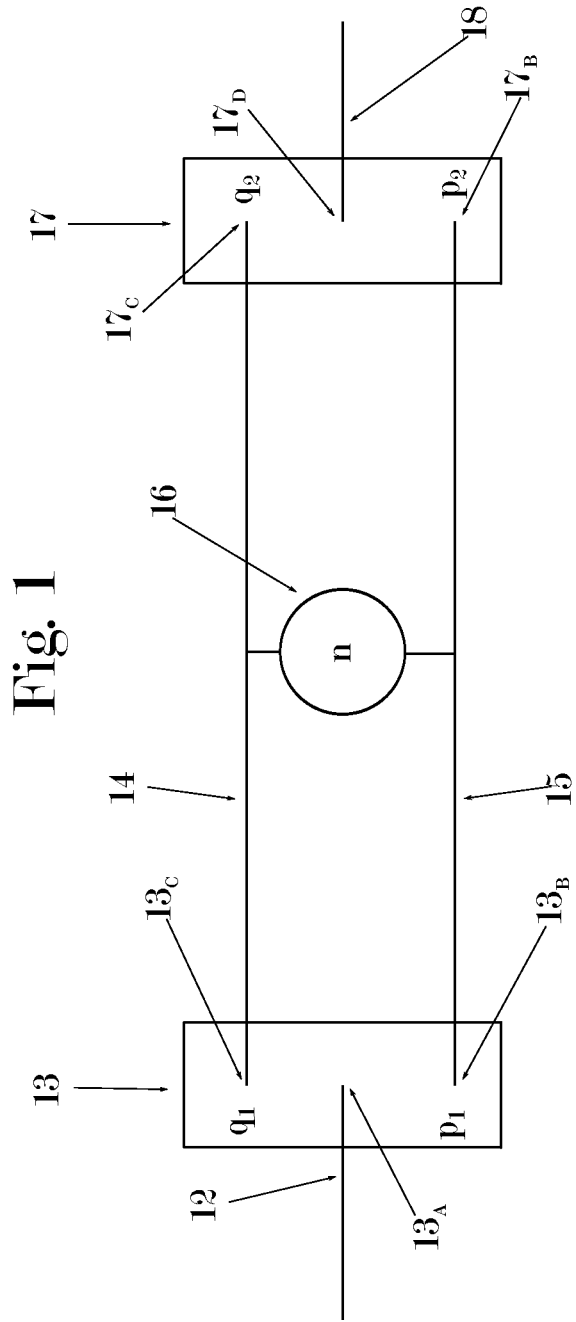
FIG. 1 depicts an embodiment of the invention showing how the various shafts connect to the generic differential gear trains and the variator.

FIG. 1 depicts an embodiment of the invention. A first shaft 12 (A) is connected to a first differential gear train 13 at connection 13A. A second shaft 14 (C) and a third shaft 15 (B) are also connected to said first differential gear train 13 at connections 13B and 13C, respectively. Shafts 12, 15, and 14 rotate with speeds $\omega_A$, $\omega_B$, and $\omega_C$, respectively. Said first differential gear train 13 is a general differential gear train and is characterized by two constants p1 and q1 such that $\omega_A = p_1 \omega_B + q_1 \omega_C$.

The relative speeds of shafts 14 and 15 can be controlled with a "variator" 16 such that $n\omega_C = \omega_B$ where n is both adjustable and controllable. A value of n can be selected either manually or automatically in order to achieve superior powertrain performance (e.g., maximize fuel economy; minimize 0-60 acceleration time). The ratio of variator 16 may be controlled by some mechanical means (e.g., hydraulic actuator). A number of different types of variators exist that can continuously adjust the relative speeds of two rotating shafts. Such variators are commonly referred to as continuously variable transmissions (CVTs). Examples of CVTs include a pair of adjustable radius pulleys connected by a belt. In a CVT the value of n can have any value in a range between a maximum and minimum value but the maximum and minimum values of n must either both be positive or both be negative. In other words the range of n in a CVT cannot pass through zero or infinity.

The variator can also be comprised of an infinitely variable transmission (IVT). IVTs can have a wider range of n than for CVTs. For an IVT, n can have any maximum and minimum value and can pass through zero and/or infinity. IVTs are typically constructed by connecting a CVT with one or more differential gear trains. This invention is an example of an IVT.

Shafts 14 and 15 also connect with a second differential gear train 17 at 17B and 17C respectively. The third connection of the second differential gear train 17 is shaft 18 (D) connected at 17D. Said second differential gear train 17 is a general differential gear train and is characterized by two constants p2 and q2 such that $\omega_D = p_2 \omega_B + q_2 \omega_C$. The ratio q2/p2 must be different from q1/p1 for the described device to be of any use.

By controlling the ratio of the variator 16 the speed ratio of the entire device, R, may be controlled and is a function of p1, p2, q1, q2 and n:

$$R = \frac{\omega_D}{\omega_A} = \frac{q_2 + p_2 n}{q_1 + p_1 n}$$

When this device is used as an automotive transmission shaft 12 is connected to a prime mover (e.g., engine) and shaft 18 is connected to the wheels. The rotational speed of shaft 18 relative to the rotational speed of shaft 12 can span an infinite and continuous range. These ratios include forward speeds, reverse speeds and a geared neutral state where the prime mover can rotate while the output is fixed (e.g., while idling). All of these speed ratios can be achieved without the use of clutches or brake mechanisms. This range of R can be obtained if the range of n includes −q2/p2. For such applications the range of n should not include −q1/p1 as that would prevent the engine from rotating.

This device could also be used as a continuous brake pair. In such a configuration this device could hold one rotating member of some larger device connected to shaft 12 and a second rotating member of some larger device connected to shaft 18. The first rotating member of the larger device can be held fixed (i.e., braked) while the second rotating member of the larger device can rotate freely when $n = -q_1/p_1$. Furthermore, the second rotating member of the larger device can be held fixed (i.e., braked) while the first rotating member of the larger device can rotate freely when n=−q2/p2. The range of n should thus include both −q1/p1 and −q2/p2. For all other values of n the speed ratio of the output to input shafts are coupled and described by the ratio R.

A general differential gear train (e.g., 13 and 17) can be constructed in a variety of ways and could include the use of a differential epicyclic (or planetary) gear train, a differential cycloidal drive or a differential harmonic drive; wherein said differential gear train is connected to each of the three shafts with a direct connection or by mechanical gearing.

Figure 3:
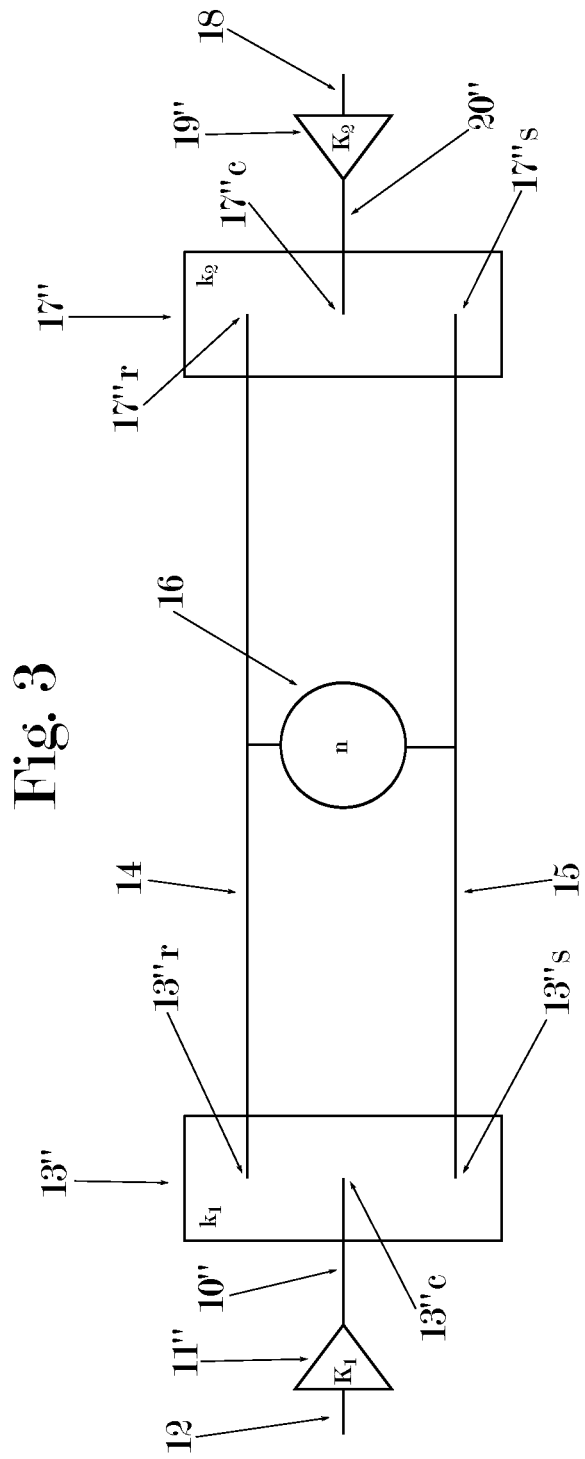
FIG. 3 depicts an embodiment of the invention where the generic differential gear trains of FIG. 1 have been replaced with differential epicyclic gear trains with two additional mechanical gearings.

FIG. 2 illustrates kinematic and mathematically equivalency of different differential gear train arrangements. A general differential gear train 30 can be constructed as an equivalent system 30' with a differential epicyclic gear train 13' (characterized by a single ratio k1) with one addition mechanical gearing 11' (characterized by the ratio K1) such that an input shaft 12 and two output shafts 14, 15 have the same kinematic relationship for both 30 and 30'. This simplifies the design process. All possible designs (combinations of p1, q1, p2 and q2) can be considered for a single topology (e.g., FIG. 1). The topology can then be changed afterwards into systems with equivalent kinematics but may be superior for manufacturing or efficiency reasons. p1, q1, p2 and q2 can then be converted into an equivalent set of k1, K1, k2 and K2. FIG. 3 illustrates this case. Consider the device 30'. It has the same input 12 as device 30 and the same outputs 14, 15. However, in device 30, input shaft 12 connects to directly to differential gear train connection 13A while in device 30', input shaft 12 connects to the epicyclic carrier gear 13$c$ via mechanical gearing 11' (K1). In device 30, output shaft 14 is connected directly to differential gear train connection 13C while in device 30' output shaft 14 is connected to the epicyclic gear train ring gear 13'$r$. Finally, in device 30, output shaft 15 is connected directly to differential gear train connection 13B while in device 30' output shaft 15 is connected to the epicyclic gear train sun gear 13'$s$.

The kinematics of device 30 can be described as follows:

$$\omega_A = p_1 \omega_B + q_1 \omega_C$$

where $\omega_A$, $\omega_B$, and $\omega_C$ are the rotational speeds of shafts 12, 15 and 14 respectively.

The kinematics of device 30' can be described as follows:

$$K_1(k_1+1)\omega_A = k_1 \omega_B + \omega_C.$$

Thus the kinematics of device 30 will be the same as those of device 30' when $$k_1 = \frac{p_1}{q_1}$$

and $$K_1 = \frac{1}{p_1 + q_1}$$

Thus only a single design topology needs to be considered when designing a device with an input shaft, output shaft, two generic differential gear trains, and a variator that controls the speed ratio of the intermediate shafts 14 and 15. Furthermore, any device of this type can be designed for a pair of generic differential gear trains (a selection of p1, q1, p2, and q2) and converted to a kinematically equivalent set of design variables (e.g., k1, K1, k2, K2).

FIG. 3 depicts an embodiment of the invention where the generic differential gear trains 13, 17 depicted in FIG. 1 have been replaced with differential epicyclic gear trains 13", 17" and two additional mechanical gearings 11", 19".

Figure 4:
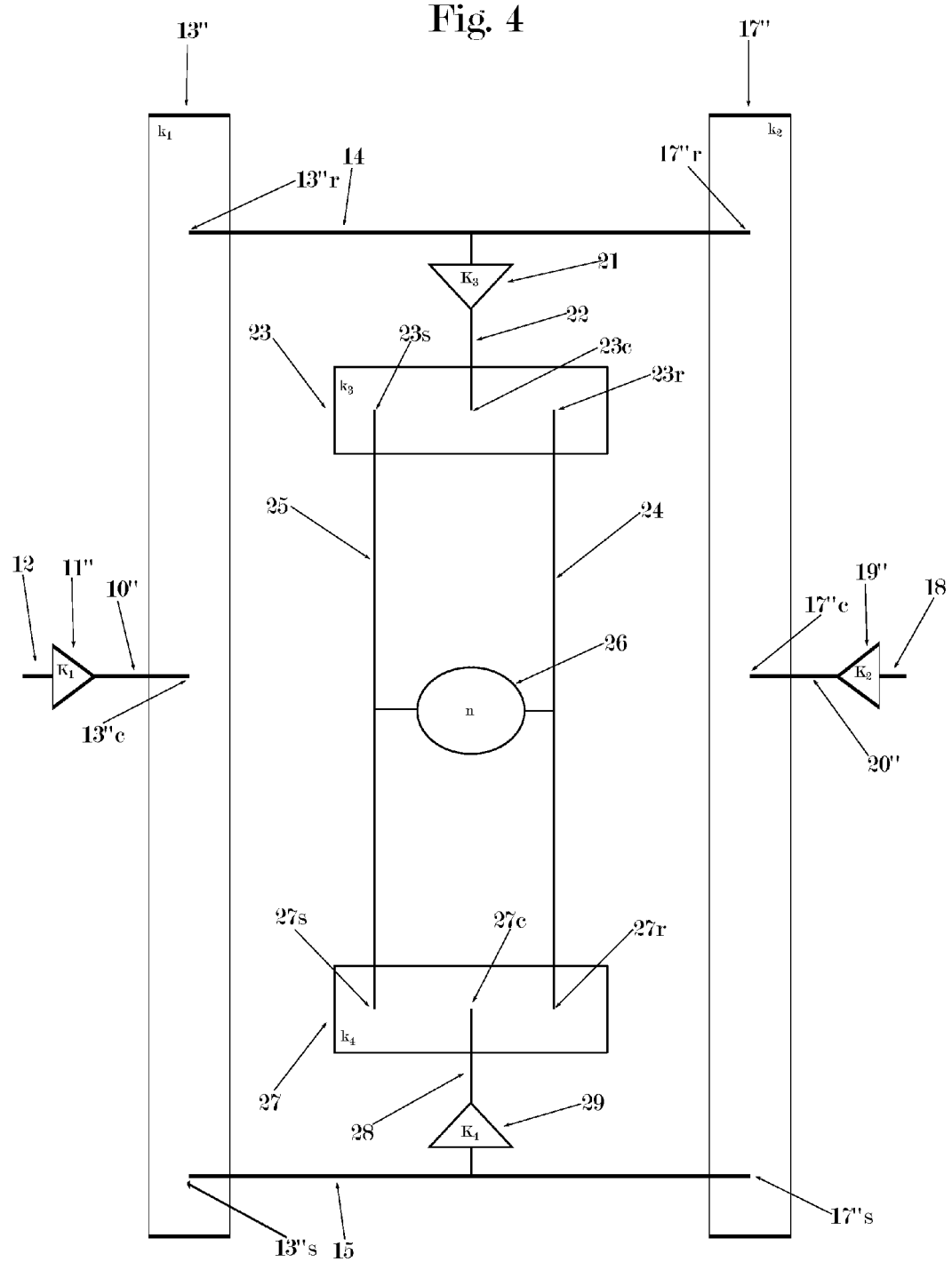
FIG. 4 depicts an embodiment of the invention where an inner device (like the one shown in FIG. 3) replaces the variator of an outer device (like the one depicted in FIG. 3).

FIG. 4 depicts an embodiment of the invention. The variator 16 shown in FIG. 3 is replaced by the device depicted in FIG. 3. Thus, in the implementation shown in FIG. 4, shaft 14 serves as the input shaft to the inner device and drives a third epicyclic gear 23 by means of mechanical gearing 21 and connecting shaft 22. The outputs of epicyclic gear 23 drive shafts 24 and 25 which are connected to the inputs of epicyclic gear 27 and connect to opposite ends of variator 26. The output of epicyclic gear 27 drives the connecting shaft 28 which is coupled to shaft 15 by means of mechanical gearing 29.

The inner mechanism 21-29 should be designed as a continuous brake pair. This allows behavior and operating conditions that would not be available with a CVT type variator. When the ratio of variator 26 is n=−k3 shaft 14 is held fixed (effectively braked) while shaft 15 can rotate freely. In this scenario all the power of the prime mover is directed along shaft 15, no power flows through the inner device 21-29 and the output speed ratio is:

$$R = \frac{K_1(k_1+1)k_2}{K_2(k_2+1)k_1}.$$

When the ratio of variator 26 is n=−k4 shaft 15 is held fixed (effectively braked) while shaft 14 can rotate freely. In this scenario all the power of the prime mover is directed along shaft 14, no power flows through the inner device 21-29 and the output speed ratio is:

$$R = \frac{K_1(k_1+1)}{K_2(k_2+1)}.$$

For any other value of n the ratio of the overall system is:

$$R = \frac{K_1(k_1+1)(k_2+R')}{K_2(k_2+1)(k_1+R')}$$

where $$R' = \frac{K_3(k_3+1)(k_4+n)}{K_4(k_4+1)(k_3+n)}$$

The closest devices to this invention are US2011201470 and U.S. Pat. No. 5,643,121 as well as derivatives of U.S. Pat. No. 5,643,121 including WO2005047736, CN10044917, and US20120142477. This invention is distinguished from US2011201470 primarily in that US2011201470 does not have a variator controlling the ratio of the two intermediate shafts. This invention is distinguished from the other four inventions in several ways which as described by the above description of the invention: a) this invention makes no use of clutches—simplifying the design, b) this invention proposes the use of a generalized differential gear trains instead of only epicyclic gear trains, c) this invention can be used as an alternative to a pair of brake mechanisms in certain situations by selecting the range of n to include −q1/p1 and −q2/q2, d) this invention describes a compound IVT where an inner IVT replaces the variator component in an outer IVT allowing for a wider range of operation including additional regimes of high efficiency.

The invention claimed is:

1. A device comprising
- a first shaft (A), second shaft (B), and third shaft (C) each connected to a first differential gear train wherein each shaft rotates with speed $\omega A$, $\omega B$, and $\omega C$, respectively, and wherein said first differential gear train is characterized by ratios p1 and q1 such that the relative rotational speeds of said three shafts are such that $\omega A = p1*\omega B + q1*\omega C$;
- a means to control the rotational speed of said second shaft ($\omega B$) relative to the rotational speed of said third shaft ($\omega C$) to be a controlled ratio: $\omega B/\omega C = n$;
- said second shaft, said third shaft, and a fourth shaft (D) each connected to a second differential gear train, wherein said fourth shaft rotates with speed $\omega D$ and wherein said second differential gear train is characterized by ratios p2 and q2 such that the relative rotational speeds of shafts B, C, and D are such that $p2*\omega B + q2*\omega C = \omega D$;
- wherein p1, q1, p2, and q2 can have each any non-zero, finite value;
- and wherein the ratio p1/q1 does not equal p2/q2.

2. The device of claim 1 wherein the first shaft is a drive shaft connected to a prime mover and the fourth shaft is a driven shaft connected to a load.

3. The device of claim 1 wherein said means to control is a continuously variable transmission such that ratio, n,
- can be selected and adjusted automatically or manually;
- can have any value in a range between a maximum and minimum value;
- and the maximum and minimum values of n are either both positive or both negative.

4. The device of claim 1 wherein one or both of said first and second differential gear trains are constructed as
- an epicyclic gear train, a cycloidal drive or harmonic drive;
- wherein said differential gear train is connected to each of the three shafts with a direct connection or by mechanical gearing.

5. The device of claim 2 wherein either the first or second differential gear trains are constructed such that p1=q1 or p2=q2.

6. The device described by claim 1 where the range of possible control ratios, n, includes −p2/q2 but does not include −p1/q1.

7. The device described in claim 1 where the range of possible variator ratios, n, include both −p1/q1 and −p2/q2.

8. The device described in claim 1 wherein said means to control is an infinitely variable transmission such that the control ratio, n,
- can be selected and adjusted automatically or manually;
- can have any value;
- and wherein said infinitely variable transmission can be constructed as a device described in claim 1.

9. The device in claim 8 wherein the range of values of n include zero and infinity.

* * * * *